(12) United States Patent
Granstrand (10) Patent No.: US 11,008,741 B2
(45) Date of Patent: May 18, 2021

(54) HOT WATER USE WARNING DEVICE FOR FAUCETS

(71) Applicant: XENIDEV AB, Stockholm (SE)

(72) Inventor: Oskar L. Granstrand, Stockholm (SE)

( * ) Notice: Subject to any disclaimer, the term of this patent is extended or adjusted under 35 U.S.C. 154(b) by 0 days.

(21) Appl. No.: 16/300,068

(22) PCT Filed: May 9, 2017

(86) PCT No.: PCT/SE2017/050466
§ 371 (c)(1),
(2) Date: Nov. 9, 2018

(87) PCT Pub. No.: WO2017/196240
PCT Pub. Date: Nov. 16, 2017

(65) Prior Publication Data
US 2019/0153709 A1 May 23, 2019

Related U.S. Application Data

(60) Provisional application No. 62/407,387, filed on Oct. 12, 2016, provisional application No. 62/333,737, filed on May 9, 2016.

(51) Int. Cl.
| | | |
|---|---|---|
| *G01K 13/02* | (2021.01) | |
| *E03C 1/086* | (2006.01) | |
| *G01K 1/16* | (2006.01) | |
| *G01K 11/12* | (2021.01) | |
| *E03C 1/04* | (2006.01) | |

(52) U.S. Cl.
CPC ............... *E03C 1/086* (2013.01); *G01K 1/16* (2013.01); *G01K 11/12* (2013.01); *G01K 13/02* (2013.01); *E03C 2001/0418* (2013.01); *G01K 2013/026* (2013.01)

(58) Field of Classification Search
CPC ..................... G01K 13/02; G01K 2013/026
See application file for complete search history.

(56) References Cited

U.S. PATENT DOCUMENTS

| | | | | |
|---|---|---|---|---|
| 1,692,012 | A * | 11/1928 | Wells ................... | F01P 11/16 |
| | | | | 116/216 |
| 4,773,767 | A * | 9/1988 | Coll ..................... | F16K 37/0058 |
| | | | | 374/147 |
| 5,265,959 | A | 11/1993 | Meltzer | |

(Continued)

OTHER PUBLICATIONS

International Search Report for corresponding PCT Application No. PCT/SE2017/050466.

*Primary Examiner* — Charlie Y Peng (57) ABSTRACT

A low-cost hot water use warning device, having the shape of an aerator housing, including a metallic housing inner core (2) with threads configured for attachment to a faucet and a ridged indented channel for accommodating a thermochromic belt (6) or band that may constitute several layers including an outer thermochromic layer (10) capable of changing its color at a certain temperature, a second high thermal conductivity layer (11) made of copper for evening out temperature gradients and a third low heat conducting polymeric layer (12) for imposing a controlled delay. At each vertical side of the thermochromic belt are flanking wedge-shaped isolation grooves (7). The device operates as an awareness indicator for informing a faucet user of excessive temperature and duration of hot water use.

21 Claims, 9 Drawing Sheets

(56) References Cited

U.S. PATENT DOCUMENTS

2002/0083520 A1\* 7/2002 Osborne-Kirby ..... E03C 1/0404
　　　　　　　　　　　　　　　　　　　　　　　　4/678
2009/0121044 A1\* 5/2009 Lo ........................ E03C 1/0404
　　　　　　　　　　　　　　　　　　　　　　　　239/71
2013/0269799 A1　10/2013 Swist \* cited by examiner

Timeframe t + 0

FIG. 7B

Timeframe t + Δt

FIG. 8A

Timeframe t + 0

FIG. 8B

Timeframe t + Δt

HOT WATER USE WARNING DEVICE FOR FAUCETS

CROSS-REFERENCE TO RELATED APPLICATIONS

This application is the national phase under 35 U.S.C § 371 of PCT International Application No. PCT/SE2017/050466 which has an International filing date of May 9, 2017, which designates the United States of America and which claims priority from U.S. Provisional Application Ser. No. 62/333,737, filed May 9, 2016 and U.S. Provisional Application Ser. No. 62/407,387, filed Oct. 12, 2016, both of which are incorporated by reference herein.

BACKGROUND OF THE INVENTION

The present invention relates to water- and energy-efficiency solutions for faucets. More particularly, the invention relates to a low-cost visual metering device for informing a faucet user of excessive temperature and duration of hot water use, ultimately leading to a reduction of hot water use due to a change in user behavior.

A number of important technological solutions that saves water and hot water for faucets have become widely adopted by the market during the last decades. Perhaps the most revolutionary example is the mixing of air with the water flow through the use of aerators. Other examples include single-lever mixers, cold-start mixers, constant flow regulators, temperature limiters and thermostats. However, none of these technologies primarily targets bad user behavior leading to water waste, a reason to why many households report water and energy usage considerably higher than others of the same size, even when accounting for factors such as the number of faucets, showers and whether there is a dishwashing machine installed or not.

As building regulations continually impose rising demands on higher energy-efficiency and rational use of natural resources, the use of hot water has come to play an increasingly pivotal role in lowering the building total energy demand. In newly renovated or constructed multi-dwelling buildings for example, having already implemented solutions such as an energy-efficient building envelope and HVAC-system, hot water use alone can account for over 50% of the building total energy use. Hot water use further tends to be split evenly between faucets and showers. However, where for instance shower timers and flow-meters are offered and readily available on the market, few sensible solutions for raising user awareness are available for faucets. Most faucets cannot bear the same costs and apparatus size as the technology for a shower system is allowed to have. A number of prior art temperature indicators for faucets address the issue of conveying water temperature information in a fast and convenient way for e.g. anti-scalding purposes, as can be seen in US2013269799A1, US2002083520A1, U.S. Pat. Nos. 5,265,959A and 4,773,767A. Prior art even also suggests the use of thermochromic pigments for this purpose. However, for addressing primarily bad user behavior leading water waste, it would be a risky approach to implement only instantaneous or almost instantaneous water temperature measurement, as that may in a behavioral context lead to more hot water use—not less. Prior art can in general, and in particular for all of the above listed documents, be said to deal with means for "hot water warning", while the present invention's objective is rather to provide means for "hot water use warning", i.e. a device incorporating some kind of use metering functionality (not only temperature) for primarily water- and energy saving purposes. Therefore, there exists a need for a device such as the one disclosed by the present invention.

BRIEF DESCRIPTION OF THE DRAWINGS

Exemplary embodiments of the present invention are illustrated in the accompanying drawings, in which:

FIGS. 14A and 14B are vertical cross sections of a modified hot water use warning device also capable of reacting to cold water use.

DETAILED DESCRIPTION

Hereinafter, embodiments of a hot water use warning device for faucets, according to the present invention, are described with reference to the accompanying drawings. One embodiment is shown in FIGS. 1-3A. According to FIG. 1 the hot water use warning device 1 connects to a faucet orifice through the attachment of housing inner core 2 via its threads 3. Housing inner core 2 is in this embodiment made of a high heat conductive metallic material that is manufactured in one piece so as to allow for an efficient transport of heat. Its circular shape is further designed to accommodate the placement of an aerating unit (not shown) attached to and directly beneath particle filter 5. Washer 4 provides for a watertight seal against the faucet orifice. At the longitudinal approximate mid-center of housing inner core 2 runs an indented channel at right angle to the operational path of flow 9 (FIG. 2), affixing a thermochromic belt 6 having the shape of a ring and encircling the entire outer perimeter of housing inner core 2. On each side of thermochromic belt 6 are flanking isolation grooves 7 which according to FIG. 2 are wedge-shaped marginal spaces in the indented channel that isolates the thermochromic belt 6 from lateral direct thermal contact with housing inner core 2.

For all described embodiments, thermochromic belt 6 comprises a collection of reversible thermochromic pigments that changes color when a certain temperature, the activation temperature, is reached and returns to its original color when the temperature is decreased below the activation temperature. Thus, thermochromic belt 6 effectively operates as an energy consumption awareness indicator, or warning display, such that every time when water flow of a certain temperature and duration through the water carrying conduit 8 (FIG. 2) of hot water use warning device 1 occurs, heat is transported to and/or heat irradiation is successively absorbed by thermochromic belt 6, thereby after some time giving rise to a visible color change on the outer perimeter of the thermochromic belt 6 and by this alerting the faucet user and the nearby environment of instances of excessive hot water use.

Figure 7A:
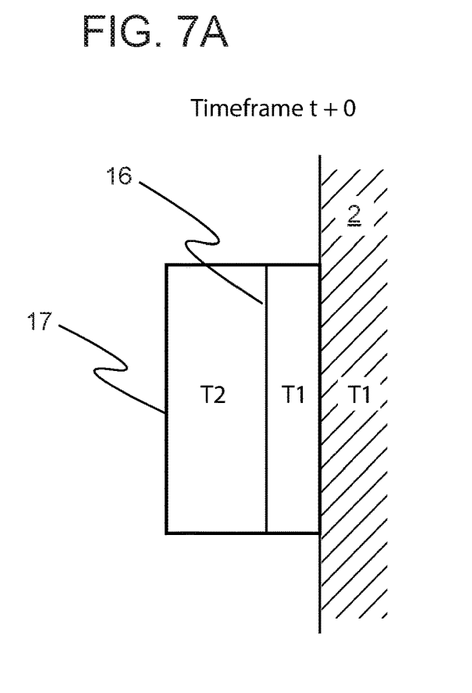
FIGS. 7A and 7B diagrammatically illustrates the progression of a temperature gradient inside a thermochromic belt in an idealized case.
Figure 7B:
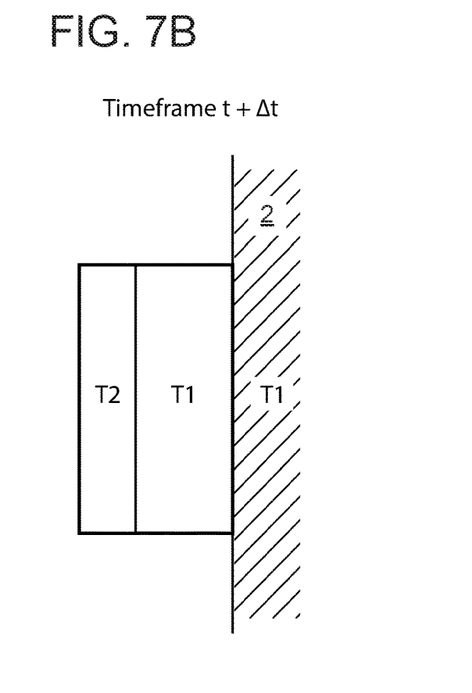

Now, as a principal illustration of heat transport through thermochromic belt 6 according to FIGS. 1-3A, reference is made to FIGS. 7A and B. At a certain timeframe t, heat with a temperature T1 has already diffused into the thermochromic belt according to the temperature gradient contour line 16. At a later time the heat has progressed as shown by FIG. 7B, the distance difference being dependent upon the thermal conductivity. Given then, temperature T2 lies below the activation temperature and T1 above, there will be a certain time delay before the display surface 17 and the thermochromic pigments residing here reach temperature T1 and consequently shift in color. The choice of material will be hugely decisive of the heat transfer rate, or in other words heat conductance or thermal diffusion rate.

In one embodiment, thermochromic belt 6 is a single piece of injection-molded thermoplastic having thermochromic pigments in the form of microencapsulated leuco dyes embedded into the polymer matrix. Suitable thermoplastics for this intermixing purpose and serving as polymer vehicles include, but are not limited to polyethylene (PE), polypropylene (PP) and acrylonitrile butadiene styrene (ABS). Masterbatches containing microencapsulated leuco dyes for blending with the aforementioned thermoplastics can be readily ordered from a number of manufacturers. Microencapsulated leuco dyes have been chosen because they are relatively cheap yet durable and being able to withstand a large number of activation cycles before degrading. Also, the embedding into a polymer matrix improves durability and decrease weathering effects. However, covering the outside of a molded thermoplastic with thermochromic pigments and thereafter optionally applying a light-filtering overcoat may also be an option. Further, if a higher degree of activation temperature accuracy is wished for, microencapsulated liquid crystals may be chosen as pigments instead. Some formulations of liquid crystals are able to provide of a spectrum of different colors within a given temperature interval.

In one embodiment, an activation temperature of 38° C. is chosen and a red colored thermoplastic polymer is selected together with microencapsulated leuco dye pigments of the kind that is totally absorptive (substantially black) up to the activation temperature at which they become transparent, and thus reveals the red color in the blend. Therefore, in this embodiment, the visible color change will be that of going from black (or very dark red) in the "off-state" to red in the "on-state". In another embodiment, blue (or cyan) colored leuco dye pigments that change into transparent when surpassing the activation temperature are chosen, as red would be the substantially opposite color according to the theory of the subtractive color mixing CMYK-model. It has further been found that utilizing blue pigments, in particular in combination with black pigments, is able to provide a more satisfying off-state appearance than what is possible by utilizing black pigments only.

In serving as the warning signal, an activation color of red would be a natural choice because it is both perceived by many as a "warning" color and is also perceived as indicative of high temperatures. In an alternative embodiment, the off-state would be represented by a green color reminiscent of environmental awareness, by the combination of dual green-to-clear and clear-to-red thermochromic pigments, sharing the same activation temperature (A-to-B representing a transition from a lower temperature to the activation temperature and where clear is implying a largely transparent shade).

By varying the thickness of thermochromic belt 6 and/or by expanding the vehicle polymer with air or blending it with materials of different heat conductance, it is possible to affect the time it takes for heat to transport from the inside perimeter to the outside perimeter of thermochromic belt 6. As principally illustrated by FIGS. 7A and B and earlier discussed, this makes it possible to introduce a controlled delay of the color change. For example, a thermochromic belt could in this manner be constructed that turns red not until after 30 seconds of hot water use at a flow rate of 1 gpm. It is understood that the time it takes for heat to transport inside housing inner core 2 is also a delay factor. However, in embodiments where choosing a high heat conducting metallic material having a heat conductance or thermal conductivity of over 100 W/(m*K) for the housing inner core 2, such as a brass-alloy, and one of the above mentioned low heat conducting thermoplastic polymers (all having thermal conductivities in the range 0.1-0.5 W/(m*K)) for the thermochromic belt 6, the delay effect is very much a result of the dimensions and isolative properties of the thermochromic belt itself. Also, a quick heating of the housing inner core 2 would ensure that heat gradients start off at the inner perimeter of thermochromic belt 6 at approximately the same time, more closely resembling the ideal cases illustrated in FIGS. 7A-8B. For a significant evening-out effect of the heat gradients to occur at the transition between the housing inner core 2 and the low thermal conductivity layer 12, the housing inner core 2 should be made from a material at least ten times as thermally conductive than the low thermal conductivity layer. However, for definition purposes a high thermal conductivity or high heat conductive material should in light of this specification be regarded as having at least twice the thermal conductivity as a low thermal conductivity material.

In another embodiment, a plurality of thermochromic rings are mounted in series in a stacked manner (preferably with some vertical space in between) along the outside of housing inner core 2, being made from a thermally conductive polypropylene polymer, whereby the topmost ring will change color first, followed by the next, due to the diffusion of heat gradually spreading from the top of the structure and downwards. Further, the rings may be chosen to each have a different color change threshold, so as to allow an even greater time separation between the color changes. For example, the first may change color at 20 s of hot water use at 1 gpm, the second at 40 s of hot water use at 1 gpm and so on. The rings could in one sense also be fused together: several batches of thermochromic pigments of different characteristics, such as different activation temperatures and different colors, could be intermixed. For example, a black thermochromic pigment with activation temperature of 35° C. could be mixed with a yellow thermochromic pigment with activation temperature of 43° C., along with a third non-thermochromic red color. Hence, this mixture would start off black, turn orange when the black clears, then finally red when the yellow clears.

Now referring to FIG. 2, having the thermochromic belt 6 positioned in a symmetrical manner with respect to the path of flow 9 (in the figure coinciding with the flow path axis L-L, running through the centroid of housing inner core 2), and e.g. not tilted in a manner that one portion of the thermochromic belt 6 is closer to the faucet orifice than the other, will ensure that for most operational scenarios heat gradients originating from the faucet orifice reaches the thermochromic belt in approximately equal time (and thus the color change will appear more or less synchronously). A relatively narrow width of the thermochromic belt would further lessen the perceptibility of unwished demarcation lines manifesting on the thermochromic belt surface during the color change phase. Also, its inherent circumferential ring shape will ensure that the rotational alignment of housing inner core 2 when mounted does not have an influence on the visibility of the thermochromic belt.

Figure 3A:
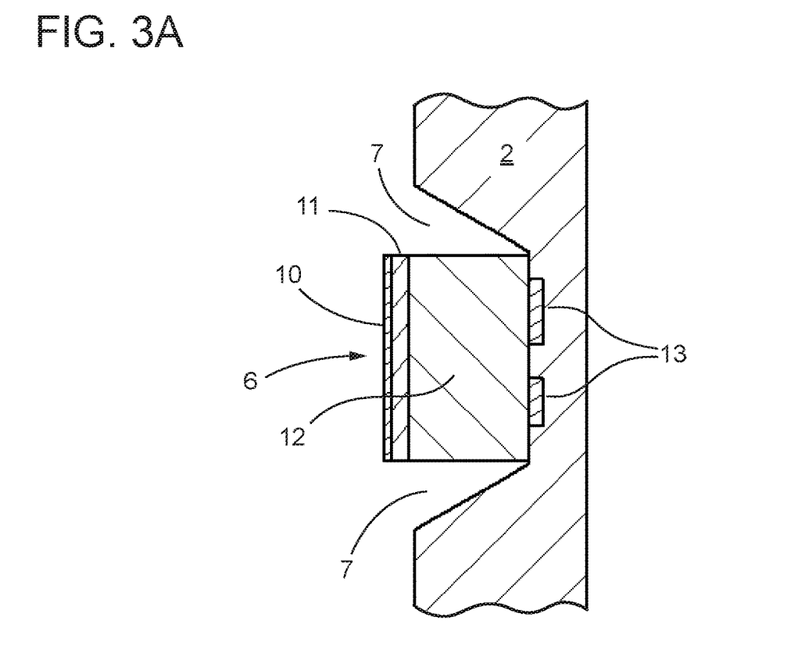
FIG. 3A shows an enlarged cross sectional view of a thermochromic belt portion as shown in FIG. 2.

In cases were an aerating unit is fitted inside the housing inner core 2, most heat would generally originate from the upper portion of the housing inner core were the threads are, since the water carrying conduit 8 would then become largely isolated from direct contact with the housing inner core inside walls. Referring to FIG. 3A, as a means for further evening-out the heat gradients inside the thermochromic belt 6 and therefore also provide for a more uniform color change, a second high thermal conductivity layer 11 is in one embodiment introduced between a first thermochromic layer 10 and a third low thermal conductivity layer 12. The thermochromic belt 6 would accordingly turn into a composite of three concentric rings. The high thermal conductivity layer 11 may advantageously be of a high heat conducting metallic material such as copper. Low thermal conductivity layer 12 and thermochromic layer 10 may both be thermochromic polymers of the earlier mentioned kinds, or for certain embodiments only the thermochromic layer 10 would have thermochromic properties and the low thermal conductivity layer 12 would instead be made from e.g. an expanded polypropylene polymer, for an even lower heat conductance. For many embodiments and operational conditions, the idealized heat transport illustrated by FIGS. 7A-B will be much more spatially uneven in practice. The temperature gradient contour line depicted here may in practice reach the uppermost portion of the thermochromic belt several seconds before reaching the lower portion. Also, for some operational conditions, heat may spread at different rates at different sections along the circumference of the belt. Apart from the evening-out effect that already occurs thanks to the interface between a high and low thermal conductivity layer, a high thermal conductivity layer 11 made from copper also effectively functions as an efficient heat sink that will buffer and even out the temperature gradients even further before ultimately reaching the thermochromic layer 10. Additionally, in controlling the spread of heat, attachment isolation grooves 13 may be introduced to both lower the speed of heat transfer between the housing inner core 2 and the thermochromic belt and to, for example, increase the relative heat transfer to the lower portion of the thermochromic belt by narrowing the lower of the two attachment isolation grooves, as shown in FIG. 3A. The attachment isolation grooves 13 could contain a low heat conducing material, or simply be air gaps. It is understood that the attachment isolation grooves need not to be specifically annular grooves (they could e.g. be pits) and they could equally well be present in the low thermal conductivity layer 12 instead of the housing inner core.

Figure 3B:
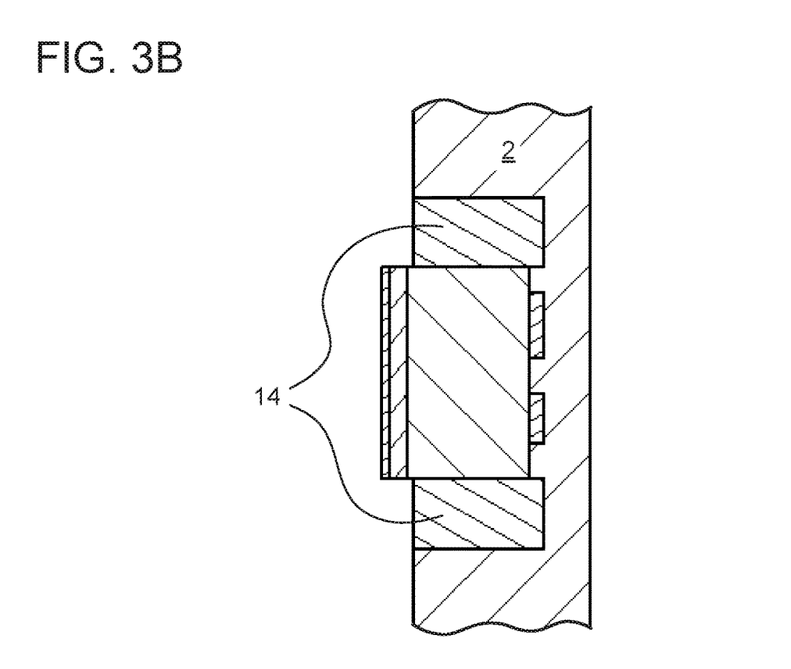
FIG. 3B shows an enlarged cross sectional view of a thermochromic belt portion similarly as FIG. 3A but having a different configuration.

Now referring to FIG. 3B, the flanking isolation grooves 7 are replaced (or perhaps more correctly implanted) with flanking isolation rinks 14, in one embodiment made of a very low heat conducting material such as expanded polypropylene, which will lessen the effect of convective air heating of the sides of thermochromic belt 6 and also provide protection for dirt or debris to enter the flanking isolation grooves. However, an operational feature of the wedge-shaped flanking isolation grooves 7 that is hereby lost is the possibility of visual feedback to the user, both directly and through reflections if the housing inner core 2 is chrome plated. This feedback would essentially be that of visual representation of the heat transport on the sides of the thermochromic belt 6, for those embodiments where the sides would have embedded thermochromic pigments. A temperature gradient line would then be physically manifested through a gradually progressing color demarcation line, which could be construed as a progressive or preemptive warning signal.

Figure 4:
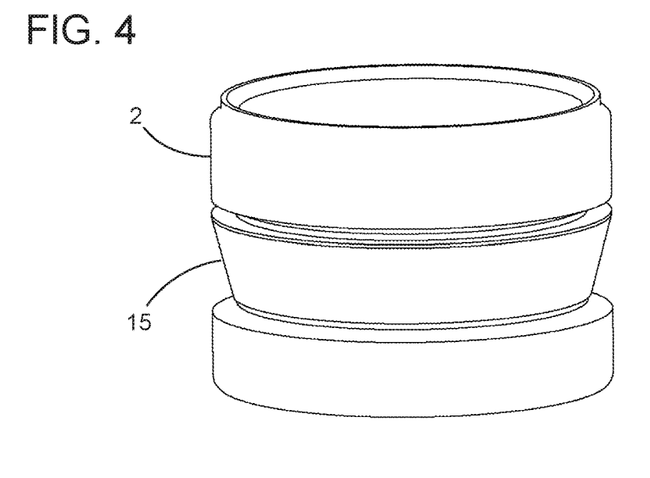
FIG. 4 illustrates a hot water use warning device in perspective featuring a wedge-shaped thermochromic belt, according to an embodiment of the invention.
Figure 5:
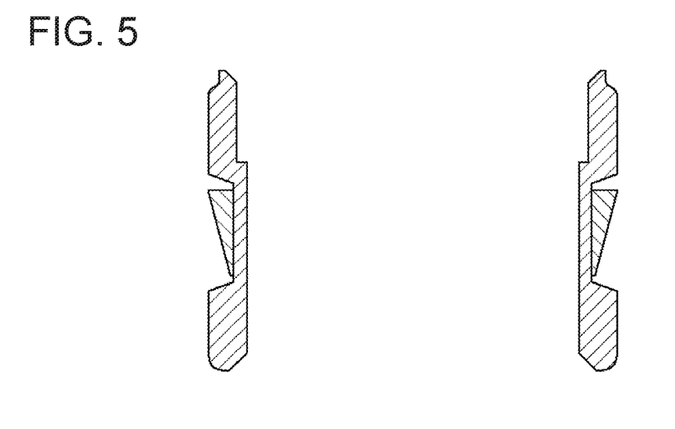
FIG. 5 is a vertical cross section of the hot water use warning device according to FIG. 4.
Figure 6:
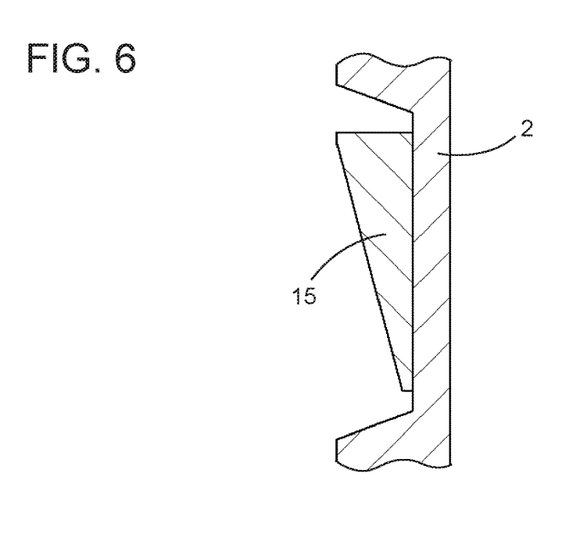
FIG. 6 shows an enlarged cross sectional view of a wedge-shaped thermochromic belt portion as shown in FIG. 5.
Figure 8A:
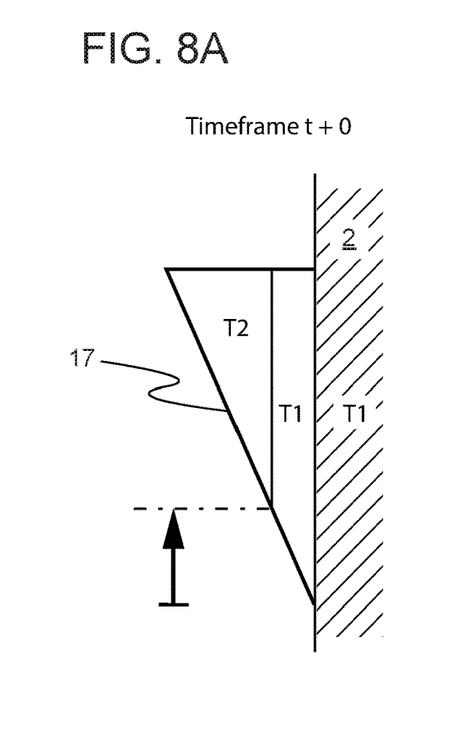
FIGS. 8A and 8B diagrammatically illustrates the progression of a temperature gradient inside a wedge-shaped thermochromic belt, in an idealized case.
Figure 8B:
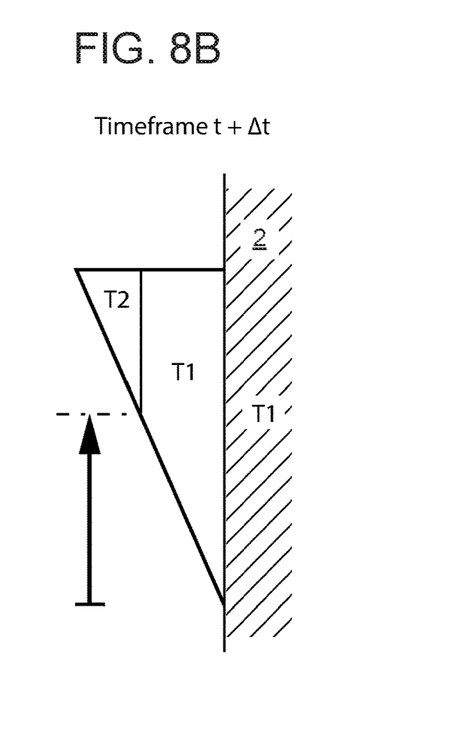

In more clearly utilizing the effect of a visible temperature gradient line, FIGS. 4-6 (here the threads, washer and filter are not shown) illustrates an embodiment having a wedge-shaped thermochromic belt 15, where its functionality is probably best understood by looking at FIGS. 8A and B. In a similar manner as in FIGS. 7A and B the temperature gradient contour line will move progressively to the left, however in doing so it will also visibly move vertically. Hence, given the temperature at the housing inner core 2 is above the thermochromic activation temperature, the operational effect will be that of a gradual vertical color progression until the entire wedge-shaped thermochromic belt 15 has changed its color.

Figure 9:
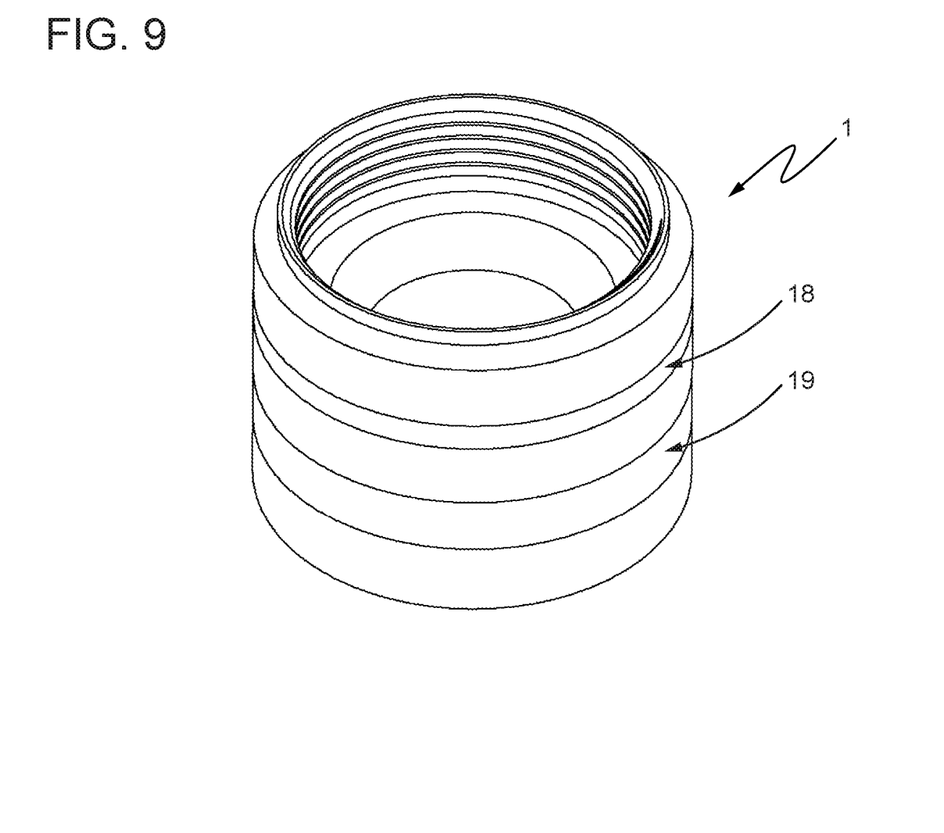
FIG. 9 illustrates a hot water use warning device in perspective, according to another embodiment of the invention.
Figure 10:
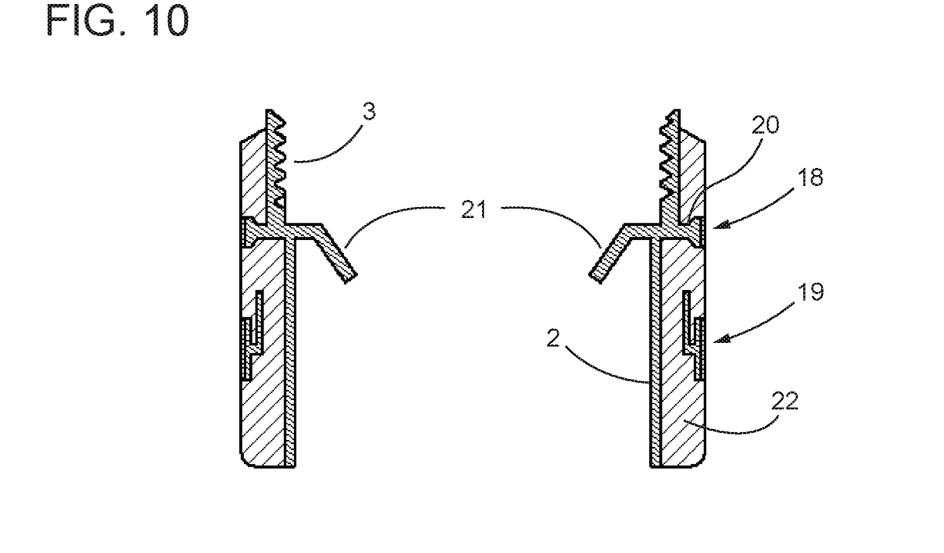
FIG. 10 is a vertical cross section of the hot water use warning device according to FIG. 9.
Figure 11:
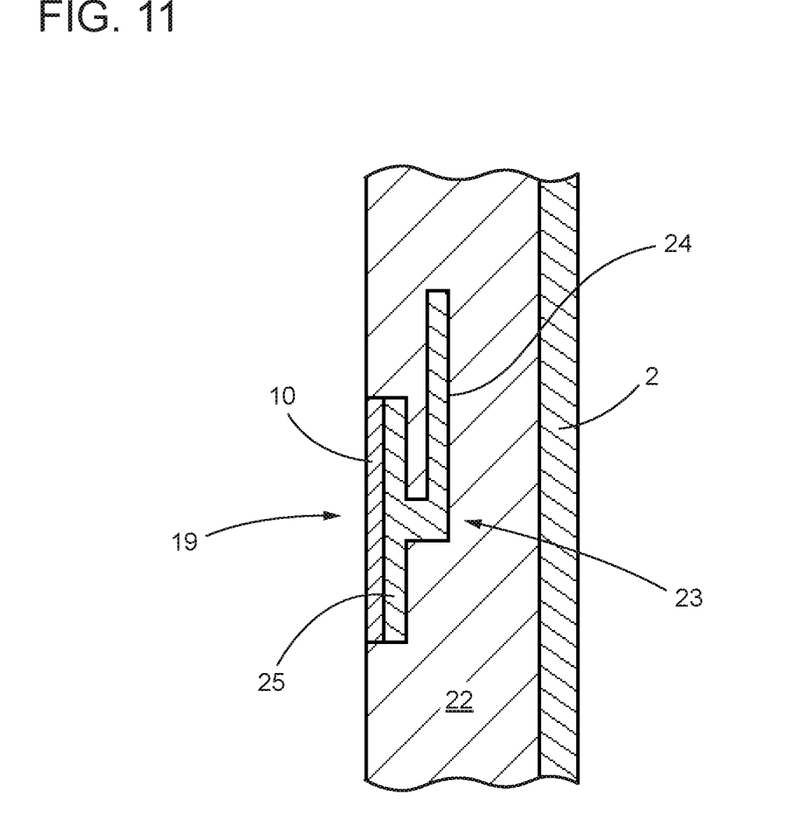
FIG. 11 shows an enlarged cross sectional view of a lower thermochromic belt portion as shown in FIG. 10.

In another embodiment, now referring to FIGS. 9-11, the hot water use warning device 1 comprises an upper thermochromic belt 18 for the purpose of also providing instant feedback to the user of the hot water temperature. This is essentially accomplished by letting a protruding member 20 of a high heat conducting housing inner core 2 protrude into close proximity with visible thermochromic pigments embedded along the outer perimeter of the upper thermochromic belt 18, as shown in FIG. 10. In FIGS. 9-11, lower thermochromic belt 19 is a structurally modified kind of the thermochromic belt 6 as earlier described, but essentially having the same end-functionality. In one embodiment, a housing inner core 2 made of brass is over-molded with a thermoplastic thermochromic polymer (i.e. a polymer matrix with thermochromic pigments embedded, as earlier described), effectively forming a housing outer core 22, as shown in FIG. 10. Aside from providing adaptable aesthetic possibilities and structural protection, housing outer core 22 is also performing the similar function as that of third low thermal conductivity layer 12 (FIG. 3A). In one embodiment and as shown in FIG. 10, stream contact flanges 21 are inwardly pointing protrusions of the housing inner core 2, being able to make direct contact with the water stream, whereby a quicker and more responsive heating of the protruding member 20 is achieved. In another embodiment, now referring to FIG. 11, heat distributing member 23 serves a similar purpose as that of second high thermal conductivity layer 11 (FIG. 3A), that is to buffer and even out the temperature gradients before reaching the thermochromic layer 10. Heat distributing member 23 may similarly be made out of copper or some other suitable high conductive material. Compared to the second high thermal conductivity layer 11 (FIG. 3A), heat distributing member 23 further comprises a heat pick-up arm 24, which is a vertically extending structure emanating in an elbow shape from the back center region of a heat buffer platform 25. In vertically extending beyond the uppermost portion of the heat buffer platform 25, as shown, the heat pick-up arm 24 serves dual purposes. It "catches" temperature gradients originating from the vertical section of the housing center core 22 above the heat buffer platform 25 and "releases" them into the center region of the heat buffer platform, before they have time to reach the topmost region. It also catches temperature gradients originating from the housing inner core 2 wall in the horizontal direction and focuses them into the center region of the heat buffer platform. Thus, an even greater degree of controlled heating, and therefore a more even and a more defined color change, of the thermochromic layer 10 is possible. The disclosed structure would be especially useful when using over-molding techniques. In one embodiment, thermochromic layer 10 is of the same thermochromic polymer kind as the housing outer core 22 and an opaque paint, plating or overcoat is further applied to the areas according to FIG. 9 that are outside of the illustrated thermochromic belt regions to prevent visible color changes occurring here.

In another embodiment and now again referring to FIGS. 3A and B, thermochromic belt 6 comprises flanking isolation rinks 14 in a single piece of molded or extruded thermoplastic vehicle polymer, having the areas where the flanking isolation rinks would be present painted, plated or coated to prevent or mask visible color changes from occurring in these areas. In such an embodiment, as a solution to avoid having to extend the width of these areas unduly it has been found particularly suitable to utilize a housing inner core made of an austenitic steel grade, such as EN 1.4305, instead of a brass alloy as austenitic steel has a much lower heat conductance than brass, typically around 15 W/(m*K), and would significantly add to the overall heat transport delay. In another embodiment and again referring to FIG. 10, the upper thermochromic belt 18, protruding member 20 and stream contact flanges 21 are omitted, and in yet another embodiment the housing inner core 2 is further of the same material as, and integrated with the housing outer core 22.

Figure 12A:
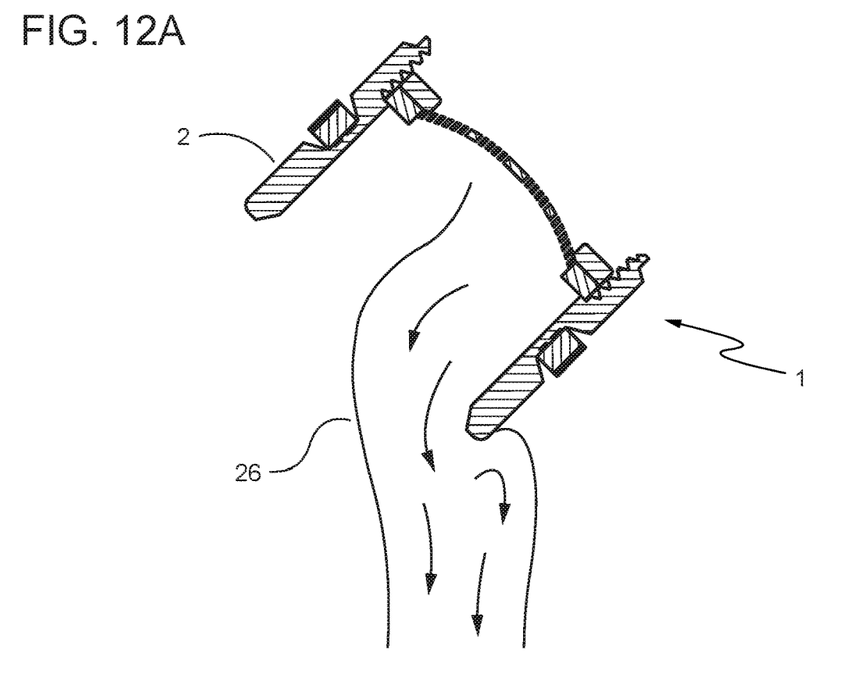
FIGS. 12A and 12B are vertical cross sections of a hot water use warning device operating in a tilted condition, without and with an annular wetting cut-off groove.
Figure 12B:
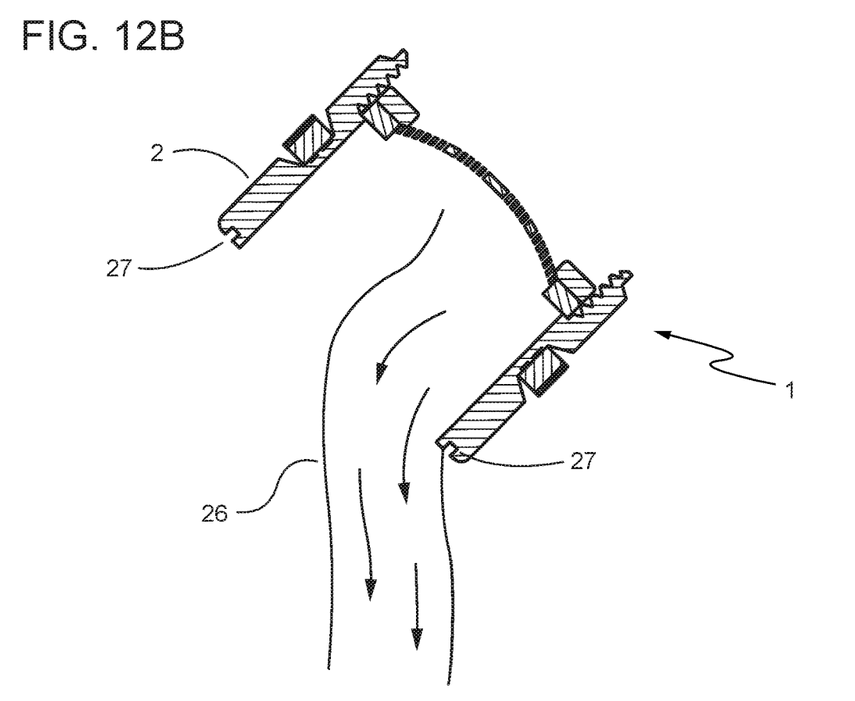

Now referring to FIGS. 12A and B, illustrating the hot water use warning device 1 operating in a tilted condition, with and without an annular wetting cut-off groove 27 present at its outlet. As can be seen in FIG. 12A, when there is no wetting cut-off groove present, part of the water stream 26 adheres to the surface of the housing inner core 2 and causes water to surround the edge of exit and even flow somewhat "upwards" as shown due to centripetal acceleration around the edge along with surface adherence forces of the water. The phenomenon causes an increase in heat transfer to the lower part of the housing inner core, which in turn results in an undesired accelerated directional (spot) heating of the thermochromic belt 6. A solution for a more uniform heating of the thermochromic belt 6 under tilted operation is presented by the use of a wetting cut-off groove 27 that breaks the water adherence along the exit edge, as illustrated by FIG. 12B. Undue directional heat transfer is hereby lessened and the stream also becomes straighter at tilted operational conditions.

Figure 13A:
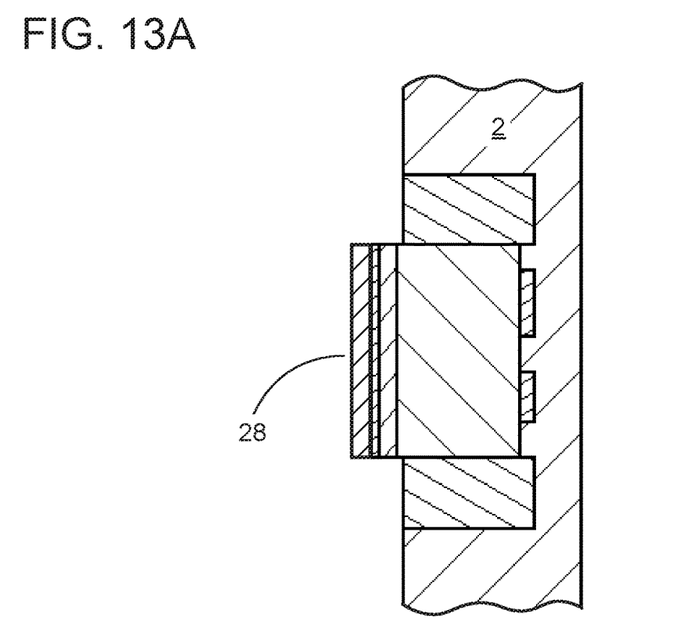
FIG. 13A shows an enlarged cross sectional view of a thermochromic belt portion according to FIG. 3B with an added outer isolation layer.

In another embodiment, and now referring to FIG. 13A, a fourth transparent outer isolation layer 28 placed over the thermochromic layer 10 will lessen the convective heat transfer between the thermochromic layer 10 and the outside environment, thereby retaining the color shift of the thermochromic layer 10 for longer durations. Depending on the material chosen, outer isolation layer 28 may also act as an efficient UV-filter for lowering the weathering effects of the thermochromic pigments.

Figure 13B:
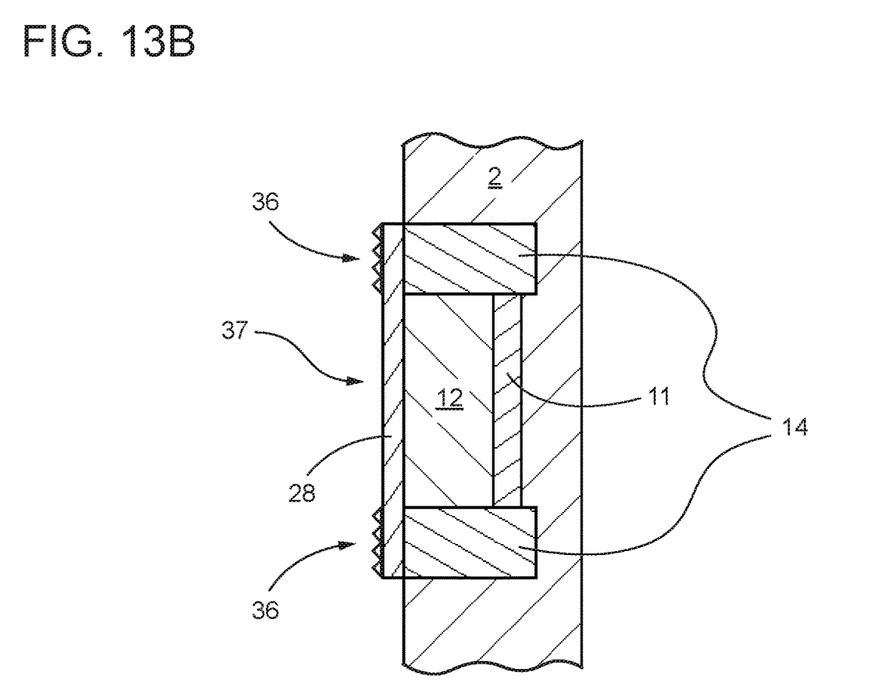
FIG. 13B shows an enlarged cross sectional view of a thermochromic belt portion according to FIG. 3B with an alternative configuration and comprising an outer isolation layer having bilaterally roughened surfaces.

In another embodiment, and now referring to FIG. 13B, outer isolation layer 28 further comprises a yellow to red colored visible light filter such as a red-shifted UV-absorber and/or a translucent red dye, for increased protection of the thermochromic pigments from long-term light damage but still being able to retain a good color shade and contrast between the off- and on-state if the underlying colors are purple to blue. In this embodiment, thermochromic layer 10 has been omitted and thermochromic pigments have been directly suspended into a low thermal conductivity layer 12, adhering to a high thermal conductivity layer 11 made of copper, in turn adhering to a housing inner core 2 made of austenitic stainless steel. Such a configuration would effectively have the housing inner core 2 functioning as a second low thermal conductivity layer, adding significant time to the overall heat transport delay as earlier pointed out. For the purpose of further increasing perceived color intensity and uniformity, above the approximate positions of the flanking isolation rings 14 portions of the outer surface of the outer isolation layer 28 comprises a roughened surface 36 for collecting and dispersing outside light into the outer isolation layer 28. To aid in distributing light rays entering through roughened surface 36, glossy surface 37 is highly reflective for providing total internal reflection possibilities of the light rays. An example of a suitable material composition of outer isolation layer 28 would be a blend of polycarbonate and a thermoplastic elastomer such as TPU, for good environmental stress crack resistance yet still with a high absorption capability in the ultraviolet range. It is understood, that the outer isolation layer 28 could be omitted and have its light-filtering constituents intermixed with low thermal conductivity layer 12.

Figure 1:
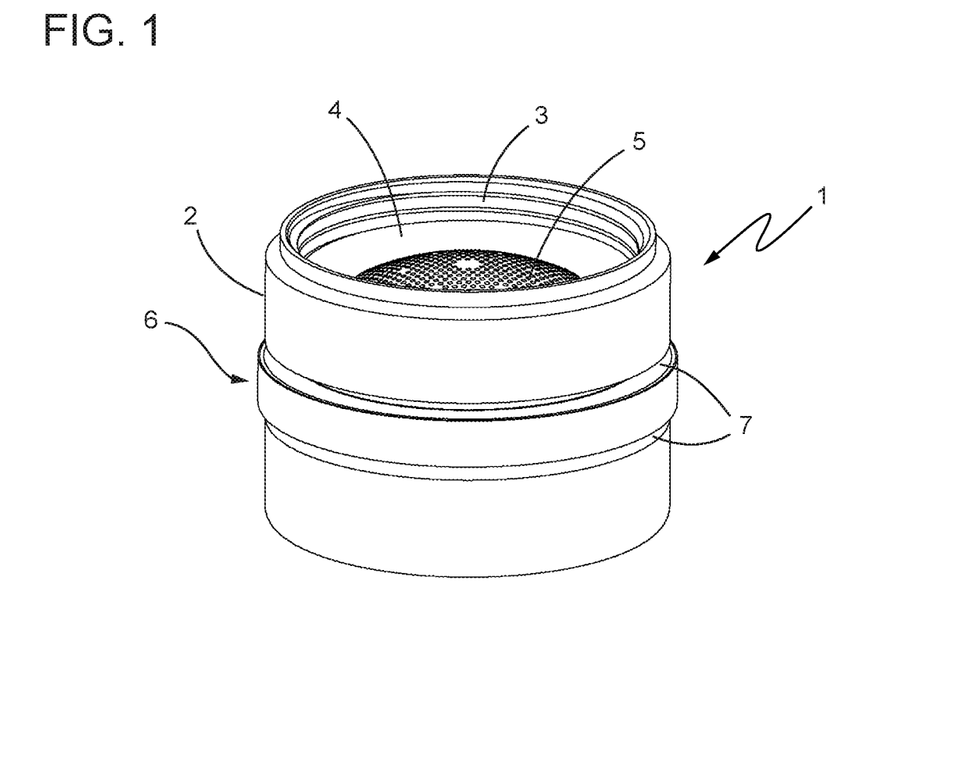
FIG. 1 illustrates a hot water use warning device in perspective, according to an embodiment of the invention.
Figure 2:
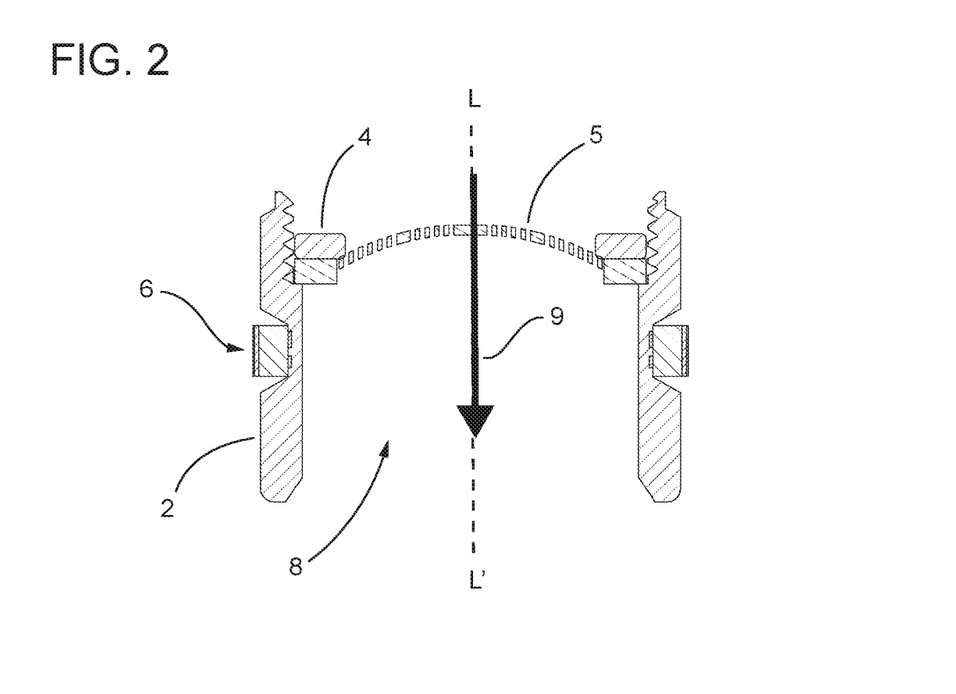
FIG. 2 is a vertical cross section of the hot water use warning device according to FIG. 1.
Figure 12C:
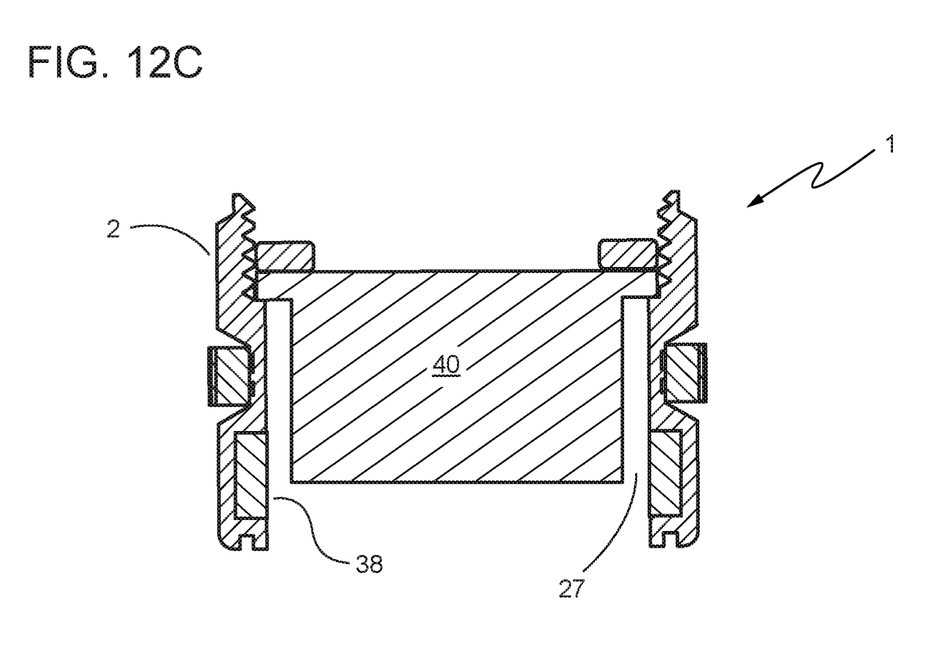
FIG. 12C is a vertical cross section of a hot water use warning device operating with an aerating unit installed, showing the placement of an added inner isolation ring.

Now turning to FIG. 12C, showing a vertical cross section of the hot water use warning device according to FIG. 1, with an added inner isolation ring 38 accommodated in a circular cut out groove on the interior of housing inner core 2. The purpose of introducing inner isolation ring 38, suitably made of a low heat conducting material such as expanded polypropylene or some other appropriate thermoplastic, would be to lessen the effect of convective cooling occurring due to the airflow in annular air gap 39, which typically occurs when an aerating unit 40 is installed into the housing inner core 2 and operating at high flow rates. Reducing the effect of convective cooling at high flow rates would promote or amplify the consequence of a faster color shift of the thermochromic belt 6 when the flow rate is high, which is generally wished for. Apart from this, such a circular cut out groove on the interior would be able to provide a higher thermal resistance for non-uniform heating of the lower part of the housing inner core 2.

Thermochromic pigments in the form of microencapsulated dyes and crystals have been first and foremost described herein. However, as understood by anyone skilled in the art that any thermochromic material or substance that changes spectral properties under influence of temperature may likewise be regarded as a collection of thermochromic pigments for the present invention to work as described.

It is understood that threads 3 may be non-existing in an embodiment and assembly were the housing inner core 2 is in fact an integral section of the faucet.

It is understood that the embodiments of the present invention which have been described herein are merely illustrative of the principles behind it. Numerous modifications may be made by those skilled in the art without departing from the true spirit and scope of the invention.

What is claimed is:

1. A hot water use warning device configured for attachment to a faucet, comprising:
    a collection of reversible thermochromic pigments having substantially equal activation temperatures and annularly distributed in a ring shaped thermochromic belt along the outer circumference of a water carrying conduit;
    wherein said thermochromic belt is substantially symmetrically placed with respect to the general flow path of water in said water carrying conduit, whereby heating of said reversible thermochromic pigments to a predetermined temperature occurs at approximately equal times and is regardless of the rotational alignment around the flow path axis of said thermochromic belt;
    wherein said thermochromic belt comprises a low heat conducting material circumferentially encircling a housing inner core having a high heat conductance, whereby a delayed color change of said reversible thermochromic pigments is substantially controllable by varying the thickness of said thermochromic belt and an evening-out effect of heat gradients is introduced and,
    wherein said thermochromic belt has two flanking isolation rinks vertically positioned on either side, whereby said thermochromic belt is prevented from lateral direct thermal contact with said housing inner core and the color change is more uniform.

2. The hot water use warning device according to claim 1, wherein said housing inner core having a high heat conductance is made from stainless steel.

3. The hot water use warning device according to claim 1, wherein said flanking isolation rinks appear as masked areas on said thermochromic belt.

4. The hot water use warning device according to claim 1, wherein said housing inner core comprises attachment isolation grooves for further controlling the spread of heat and running along the circumference of where the thermochromic belt attaches.

5. The hot water use warning device according to claim 1, wherein said housing inner core comprises a wetting cut-off groove encircling the lower rim of exit, whereby a more uniform heating of the thermochromic belt under tilted operation is achieved.

6. The hot water use warning device according to claim 1, wherein said thermochromic belt further comprises a transparent outer isolation layer having a roughened surface laterally positioned as two horizontal bands having a glossy surface in-between, whereby outside light is allowed be collected and dispersed into said outer isolation layer for an increased illumination of the underlying structure.

7. The hot water use warning device according to claim 1, wherein said housing inner core comprises a circular cut out groove on the interior of said housing inner core, whereby a higher thermal resistance for non-uniform heating of the lower part of the housing inner core is provided.

8. The hot water use warning device according to claim 7, wherein said circular cut out groove accommodates an inner isolation ring, whereby the color change of said thermochromic belt occurs more quickly at high flow rates when an aerator unit is installed.

9. A hot water use warning device configured for attachment to a faucet, comprising:
    a collection of reversible thermochromic pigments having substantially equal activation temperatures and annularly distributed in a ring shaped thermochromic belt along the outer circumference of a water carrying conduit;
    wherein said thermochromic belt is substantially symmetrically placed with respect to the general flow path of water in said water carrying conduit, whereby heating of said reversible thermochromic pigments to a predetermined temperature occurs at approximately equal times and is regardless of the rotational alignment around the flow path axis of said thermochromic belt;
    wherein said thermochromic belt comprises a low heat conducting material circumferentially encircling a housing inner core having a high heat conductance, whereby a delayed color change of said reversible thermochromic pigments is substantially controllable by varying the thickness of said thermochromic belt and an evening-out effect of heat gradients is introduced and,
    wherein said thermochromic belt comprises a high thermal conductivity layer adhering to said housing inner core and having a substantially higher thermal conductivity than said housing inner core.

10. The hot water use warning device according to claim 9, wherein said high thermal conductivity layer is made from copper.

11. The hot water use warning device according to claim 9, wherein said housing inner core having a high heat conductance is made from stainless steel.

12. The hot water use warning device according to claim 9, wherein said housing inner core comprises a wetting cut-off groove encircling the lower rim of exit, whereby a more uniform heating of the thermochromic belt under tilted operation is achieved.

13. The hot water use warning device according to claim 9, wherein said thermochromic belt further comprises a transparent outer isolation layer having a roughened surface laterally positioned as two horizontal bands having a glossy surface in-between, whereby outside light is allowed be collected and dispersed into said outer isolation layer for an increased illumination of the underlying structure.

14. The hot water use warning device according to claim 9, wherein said housing inner core comprises a circular cut out groove on the interior of said housing inner core, whereby a higher thermal resistance for non-uniform heating of the lower part of the housing inner core is provided.

15. The hot water use warning device according to claim 14, wherein said circular cut out groove accommodates an inner isolation ring, whereby the color change of said thermochromic belt occurs more quickly at high flow rates when an aerator unit is installed.

16. The hot water use warning device according to claim 9, wherein said housing inner core comprises attachment isolation grooves for further controlling the spread of heat and running along the circumference of where the thermochromic belt attaches.

17. A hot water use warning device configured for attachment to a faucet, comprising:
- a collection of reversible thermochromic pigments having substantially equal activation temperatures and annularly distributed in a ring shaped thermochromic belt along the outer circumference of a water carrying conduit;
- wherein said thermochromic belt is substantially symmetrically placed with respect to the general flow path of water in said water carrying conduit, whereby heating of said reversible thermochromic pigments to a predetermined temperature occurs at approximately equal times and is regardless of the rotational alignment around the flow path axis of said thermochromic belt;
- wherein said thermochromic belt comprises a low heat conducting material circumferentially encircling a housing inner core having a high heat conductance, whereby a delayed color change of said reversible thermochromic pigments is substantially controllable by varying the thickness of said thermochromic belt and an evening-out effect of heat gradients is introduced and,
- wherein said thermochromic belt comprises a wedge-shaped cross section, whereby a progressive or preemptive warning signal is visibly represented as a vertically moving temperature gradient line.

18. The hot water use warning device according to claim 17, wherein said housing inner core comprises attachment isolation grooves for further controlling the spread of heat and running along the circumference of where the thermochromic belt attaches.

19. The hot water use warning device according to claim 17, wherein said housing inner core comprises a wetting cut-off groove encircling the lower rim of exit, whereby a more uniform heating of the thermochromic belt under tilted operation is achieved.

20. The hot water use warning device according to claim 17, wherein said housing inner core comprises a circular cut out groove on the interior of said housing inner core, whereby a higher thermal resistance for non-uniform heating of the lower part of the housing inner core is provided.

21. The hot water use warning device according to claim 20, wherein said circular cut out groove accommodates an inner isolation ring, whereby the color change of said thermochromic belt occurs more quickly at high flow rates when an aerator unit is installed.

* * * * *